United States Patent [19]

McNaughton et al.

[11] Patent Number: 5,161,832
[45] Date of Patent: Nov. 10, 1992

[54] PLASTIC RETAINER FOR FLUID COUPLING

[75] Inventors: James McNaughton, Rochester; Donald C. Walker, Pontiac, both of Mich.

[73] Assignee: Huron Products Industries, Inc., Mt. Clemens, Mich.

[21] Appl. No.: 777,060

[22] Filed: Oct. 16, 1991

[51] Int. Cl.⁵ .............................................. F16L 37/00
[52] U.S. Cl. .................................... 285/319; 285/93; 285/921; 285/320; 285/924; 29/237
[58] Field of Search ............... 285/93, 319, 921, 320, 285/924; 29/237

[56] References Cited

U.S. PATENT DOCUMENTS

| | | | |
|---|---|---|---|
| 2,441,344 | 5/1948 | Bosworth | 285/347 |
| 3,711,125 | 1/1973 | Dehar | 285/DIG. 22 |
| 3,805,567 | 4/1974 | Agius-Sinerco | 285/381 X |
| 4,524,995 | 6/1985 | Bartholomew | 285/54 |
| 4,610,468 | 9/1986 | Wood | 285/81 |
| 4,681,351 | 7/1987 | Bartholomew | 285/319 |
| 4,890,866 | 1/1990 | Arp | 285/319 X |
| 4,915,421 | 4/1990 | Dennany, Jr. | 285/921 X |
| 4,944,536 | 7/1990 | Bartholomew | 285/319 |
| 4,964,658 | 10/1990 | Usui et al. | 285/319 |
| 5,002,315 | 3/1991 | Bartholomew | 285/319 X |
| 5,009,454 | 4/1991 | Bartholomew | 285/24 |

Primary Examiner—Randolph A. Reese
Assistant Examiner—Timothy Aberle
Attorney, Agent, or Firm—Kinzer, Plyer, Dorn, McEachran & Jambor

[57] ABSTRACT

A unique plastic retainer is disclosed having a pair of axially spaced cylindrical rings. Retainer arms for retaining an upset portion of a tube within a housing bore extend from a rear ring, and a plurality of webs connect the front and rear cylindrical rings of the retainer. When a tube is initially inserted into the housing bore, it contacts an inner periphery of the arms. The retainer then moves axially forwardly within the bore for a small distance until the forward ring abuts a seal package within the housing. Further movement of the retainer is then prevented, and the upset portion of the tube causes the arm to flex radially outwardly at a flex point in the rear ring. The upset portion may then move axially beyond the arms into a fully connected position within the housing.

12 Claims, 2 Drawing Sheets

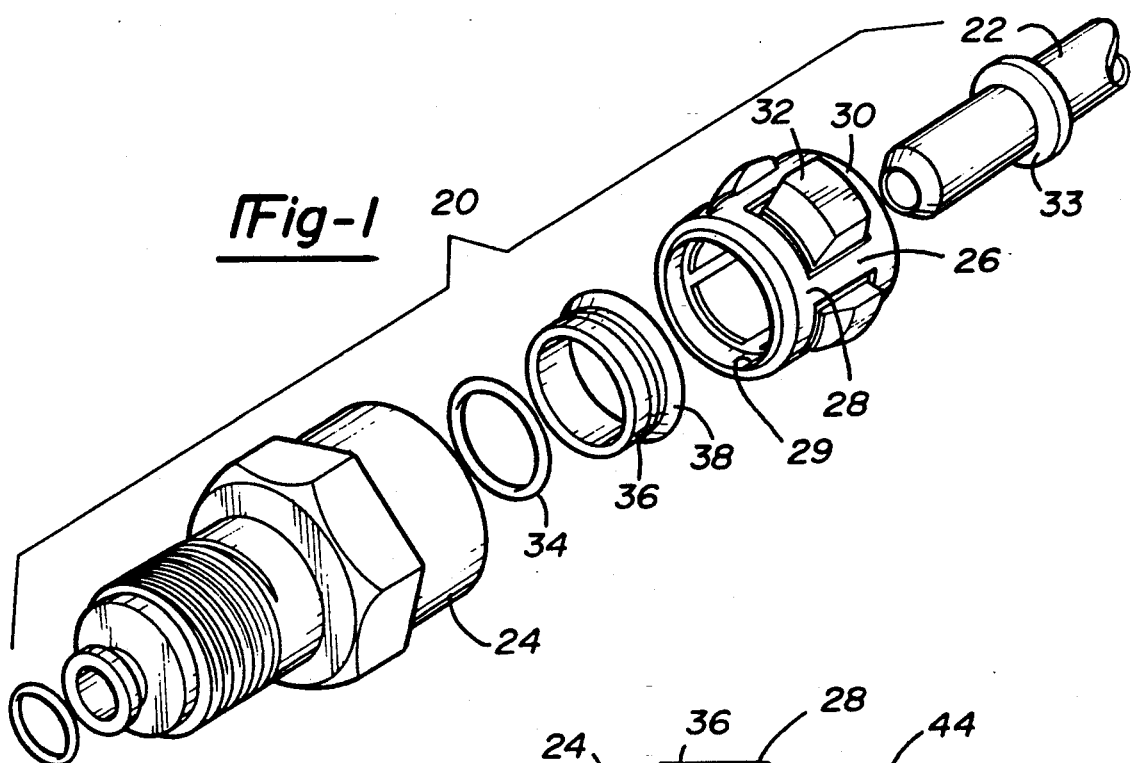
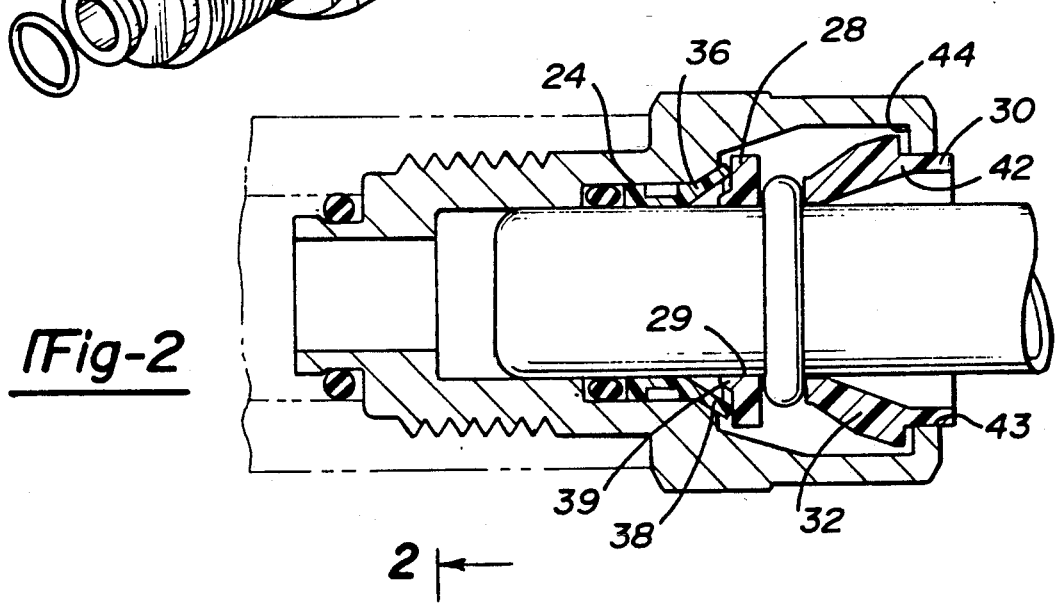
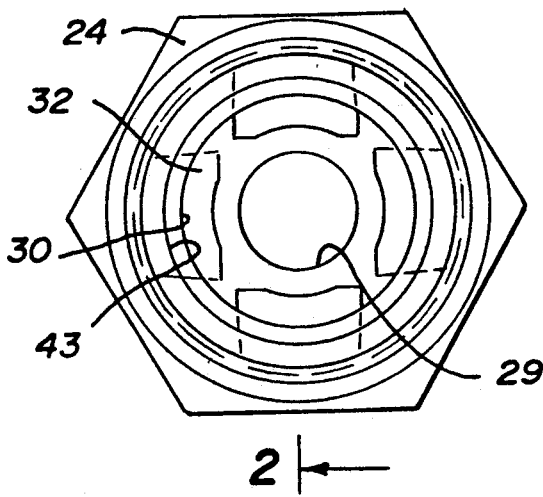

PLASTIC RETAINER FOR FLUID COUPLING

BACKGROUND OF THE INVENTION

This invention relates to a retainer that securely retains a tube within a housing.

Various types of quick connect fluid couplings are known wherein a plastic retainer has two arms which extend radially inwardly to secure a radially greater upset portion of a tube within a housing bore. Generally, the upset portion of the tube is forced inwardly of the housing bore such that it causes the arms to flex radially outwardly. The upset portion then moves axially beyond the arms. The arms move back radially inwardly, and abut the upset portion, preventing tube removal.

In this type of quick connect fluid coupling, several competing goals must be met. First, it is desirable that the arms securely retain the tube within the housing, and that a very high force be required to cause the retainer to fail and allow the tube to be removed. To this end, it is desirable to increase the number of arms which abut the upset portion of the tube.

Merely increasing the number of arms is not a satisfactory solution, however, because it becomes difficult to ensure that the arms are all positioned at proper axial positions relative to each other. If the arms are misaligned they may not all abut the upset portion of the tube. Further, it becomes difficult to ensure that the retainer body is properly positioned within the housing bore. Because of these reasons the number of arms has typically been limited and plastic retainers have not been utilized in higher pressure connections.

SUMMARY OF THE INVENTION

In a disclosed embodiment of the present invention a plastic retainer retains a tube within a housing bore. The retainer comprises a pair of axially spaced cylindrical rings with a plurality of circumferentially-spaced connecting webs extending between the two rings. Resilient arms are circumferentially-spaced between the webs, and extend from a rear flex ring. The arms abut the upset portion of a tube, and prevent tube removal.

The tube is inserted into the bore, and eventually abuts the inner periphery of the arms. The retainer then moves axially forwardly for a relatively small distance until a forward ring abuts a seal package within the housing bore. The forward ring ensures that the retainer is properly orientated and positioned within the housing bore as the tube moves beyond the resilient arms. Further movement of the retainer is prevented, and the upset portion of the tube flexes the resilient arms radially outwardly about the rear flex ring, and moves axially beyond the arms. Since the arms flex at the rear flex ring, and are all interconnected by the rear flex ring, it is ensured that the arms are all properly positioned relative to each other. Thus, the arms all abut the upset portion, preventing the tube removal and increasing the strength of the retainer. Due to the improved positioning of the retainer achieved by the spaced forward and rear rings, the inventive retainer can effectively use four arms. The retainer can thus be used in higher pressure applications.

Most preferably, the rear flex ring extends for a relatively small radial extent compared to the radial thickness of the arms at a position connected to the rear ring. This improves the flexing of the arm relative to the rear ring. In a most preferred embodiment of the present invention the arm extends radially outwardly of the radially outermost portion of the rear flex ring.

These and other objects and features of the present invention can be best understood from the following specification and drawings, of which the following is a brief description.

BRIEF DESCRIPTION OF THE DRAWINGS

FIG. 1 is an exploded view of an inventive fluid coupling.

FIG. 2 is a cross-sectional view through an assembled coupling.

FIG. 3 is a partial end view of a coupling.

DETAILED DESCRIPTION OF A PREFERRED EMBODIMENT

Figure 4:
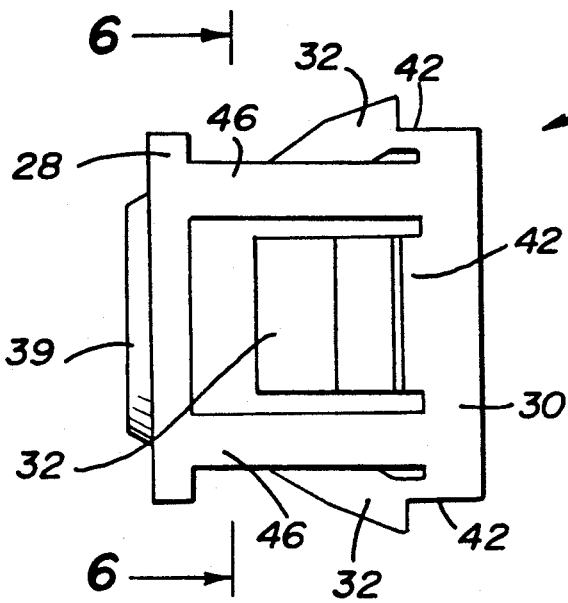
FIG. 4 is a perspective view of a retainer used in a fluid coupling.

FIG. 1 illustrates a fluid coupling 20 for securing a tube 22 within a housing 24. A retainer 26 includes a forward ring 28 and a rear flex ring 30. A bore 29 is formed in forward ring 28. A plurality of arms 32 entered from flex ring 30 and abut a radially greater, or upset portion 33 of tube 22. Retainer 26 has a conical outer surface to facilitate insertion into housing 24. A seal 34 and a steel seal retainer or spacer 36 are positioned in housing 24 axially inwardly of retainer 26. Seal retainer 36 has a flared axially outer end 38.

As shown in FIG. 2, a plurality of arms 32 abut upset portion 33 to prevent tube removal. Forward ring 28 abuts an axially outer end of flared outer end 38, and a generally conical inner portion 39 of forward ring 28 extends axially inwardly of flared outer end 38.

As tube 22 is inserted within housing 24, upset portion 33 contacts an inner peripheral surface on arms 32. Arms 32 have an inner peripheral surface which extends radially inwardly along a direction axially inwardly from flex ring 30. That is, the inner periphery of arms 32 is spaced from a center axis X of housing 24 by a greater distance at an axial location adjacent flex ring 30 than it is spaced from the same axis at an axially inner end of arms 32.

Once upset portion 33 contacts the inner periphery of arms 32, retainer 26 may move further axially inwardly for a relatively small amount until forward ring 28 contacts flared outer end 38 of seal retainer 36. Further axial movement of retainer 26 is now prevented. There is a small axial clearance between housing 24 and retainer 26 to allow for the axial clearance between housing 24 and retainer 26 to allow for the axial movement of retainer 26, and the outward flexing of arms 32. As tube 22 continues to be inserted, upset portion 33 will cause arms 32 to flex radially outwardly approximately about a point 42 in rear flex ring 30. Upset portion 33 will eventually move axially beyond arms 32. Arms 32 flex back radially inwardly and tube 22 is fully connected within retainer 26.

Since forward ring 28 positions retainer 26 by being forced against seal package 36, it is ensured that retainer 26 is properly orientated and positioned within housing 24. Further, since rear flex ring 30 connects each arm 32, it is ensured that the arms 32 are all properly axially positioned relative to the other, and that they all abut upset portion 33.

Rear ring 30 is cylindrical and extends axially outwardly of an entrance bore 43 in housing 24. Arms 32 are spaced from an inner wall 44 that defines bore 43. Thus, rear ring 30 and arms 32 do not abut any portion of housing 24, or have a positioning function.

FIG. 3 is a view looking inwardly of housing 24 prior to the insertion of tube 22. As shown, arms 32 extend radially inwardly of bore 43 to housing 24. Rear flex ring 30 is received within bore 43, and bore 29 in forward ring 28 for receiving the axially inner end of tube 22 is positioned axially inwardly of bore 43.

FIG. 4 is a perspective view of plastic retainer 26. As shown, a plurality of webs 46 extend axially between forward ring 28 and rear flex ring 30, connecting the two. Arms 32 are integrally formed with rear ring 30, such that arms 32 flex about point 42. Arms 32 extend radially outwardly from the radially innermost portion of ring 30, and beyond the radially outermost portion of ring 30. Arms 32 are solid.

Figure 5:
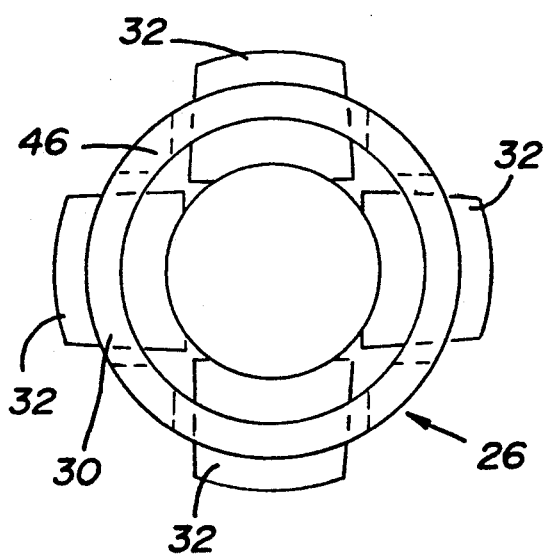
FIG. 5 in an end view of the retainer illustrated in FIG. 4.

As shown in FIG. 5, webs 46 extend over a smaller circumferential extent at the radial inner portions than they do at radially outer portions. Arms 32 have a curved inner periphery such that they conform to the outer surface of tube 22.

Figure 6:
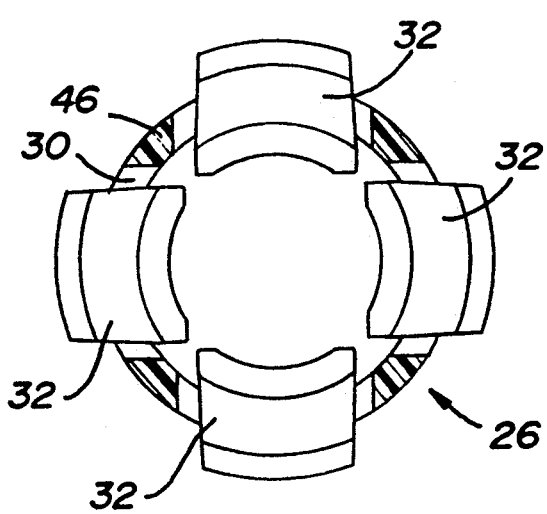
FIG. 6 is a cross-sectional view along line 6—6 as shown in FIG. 4.

FIG. 6 is a cross-sectional view along line 6—6 as shown in FIG. 4. Arms 32 extend radially beyond the radially outermost portion of rear flex ring 30, and then extend radially inwardly.

In a most preferred embodiment of this invention, the plastic retainer was formed of a material available under the trademark Carilon TM, Code P1000, which is a product available from Shell Chemical. Its generic name is aliphatic polyketone, or APK.

A preferred embodiment of the present invention has been disclosed, however, a worker of ordinary skill in the art would recognize that certain modifications would come within the scope of this invention. For that reason the following claims should be studied in order to determine the true scope and content of this invention.

We claim:
1. A fluid coupling comprising:
a housing defining a bore with an axis extending inwardly into said bore from an entrance to said bore;
a seal package positioned within said bore;
a one-piece plastic retainer having a cylindrical axially inner ring at a first axial position, a conically tapered portion extending inwardly from an inner face of said inner ring, and a cylindrical axially outer ring at a second axial position spaced axially outwardly from said first axial position, a plurality of arms extending axially inwardly from a radially outer peripheral surface of said outer ring, said arms having an inner periphery spaced by a greatest radial distance from said axis at a location adjacent said entrance to said outer ring, and said arm inner periphery extending radially inwardly to an axially inner end spaced from said axis by a radial dimension that is less than said greatest radial dimension;
a tube received within said bore, said tube being of a first outer diameter over the majority of an axial length, a greater diameter portion being formed at one axial portion of said tube, said greater diameter portion being spaced axially inwardly of said arms such that said arms retain said tube within said bore; and
said entrance being of a first inner diameter at a position leading into said bore, said cylindrical axially outer ring having an entrance portion with an outer diameter slightly less than said first diameter of said entrance, and said entrance portion extending axially outwardly of said entrance.

2. A fluid coupling as recited in claim 1, wherein a plurality of circumferentially spaced webs extend axially between said inner and outer rings to connect the two.

3. A fluid coupling as recited in claim 1, wherein there are at least four of said arms.

4. A fluid coupling as recited in claim 3, wherein said retainer is formed of a plastic material.

5. A fluid coupling as recited in claim 4, wherein said plastic material is an aliphatic polyketone.

6. A fluid coupling as recited in claim 1, wherein said outer ring is of a first radial thickness, and said arm is of a greater radial thickness than said first radial thickness at a location axially adjacent said outer ring.

7. A fluid coupling as recited in claim 6, wherein said arm extends radially outwardly of a radially outermost portion of said outer ring at said location axially adjacent to said outer ring.

8. A fluid coupling as recited in claim 7, wherein said arm extends radially outwardly of a radially outermost portion of said rear ring at said location axially adjacent to said rear ring.

9. A retainer for use in a fluid coupling comprising:
a plastic body centered on an axis and having a cylindrical forward ring and a cylindrical rear ring, a conically tapered portion extending from a forward face of said forward ring in a direction away from said rear ring, a plurality of webs extending between and connecting said forward and rear rings, and a plurality of arms extending from an outer peripheral surface of said rear ring in a direction toward said forward ring, said arms being resiliently attached to said rear ring and having an inner periphery spaced by a relatively great first radial distance from said axis at a location adjacent said rear ring, and said arms extending radially inwardly to an axially forwardmost position spaced by a radial distance from said axis which is less than said first radial distance; and
said rear ring being of a first radial thickness, and said arm being of a greater radial thickness than said first radial thickness at a location axially adjacent said rear ring.

10. A retainer as recited in claim 9, wherein there are at least four of said arms.

11. A retainer as recited in claim 9, wherein said plastic is an aliphatic polyketone.

12. A method of securing a tube within a housing bore comprising the steps of:
(1) positioning a seal package within the bore to seal a fluid connection between a tube and the housing;
(2) positioning a retainer within the bore, the retainer having a cylindrical forward ring spaced from a cylindrical rear ring, the forward and rear rings being connected by a plurality of circumferentially-spaced webs, the rear ring having a plurality of arms extending in a direction towards the forward ring, the arms having an inner periphery which is spaced by a relatively great radial distance from a center axis of the bore adjacent to the rear ring, and is spaced by a lesser radial distance at a position adjacent an end of the arm removed from the rear ring; and (3) inserting a tube having a first outer radial dimension over the majority of its length, and a radially greater dimension over a small portion of its axial length, until the greater dimension portion abuts the inner periphery of the arm, the tube then being forced further into the bore and forcing the retainer inwardly along with the tube until the forward ring abuts an axially outer portion of the seal package, the seal package then preventing further insertion of the retainer, continuing to insert the tube until the greater dimension portion causes the arms to flex radially outwardly about the rear ring, and allows the radially greater portion of the tube to move axially past the arms.

* * * * *